United States Patent
Chun (10) Patent No.: US 6,307,889 B1
(45) Date of Patent: Oct. 23, 2001

(54) METHOD FOR FAST INITIALIZATION OF MULTICARRIER SYSTEM AND POINT-TO-MULTIPOINT TRANSFER OF MULTICARRIER SIGNAL IN DIGITAL SUBSCRIBER LINE

(75) Inventor: You Sik Chun, Yongin (KR)

(73) Assignee: Samsung Electronics Co., Ltd., Kyungki-do (KR)

( * ) Notice: Subject to any disclaimer, the term of this patent is extended or adjusted under 35 U.S.C. 154(b) by 0 days.

(21) Appl. No.: 09/075,321

(22) Filed: May 11, 1998

(30) Foreign Application Priority Data

May 10, 1997 (KR) .................................. 97-18136

(51) Int. Cl.[7] .................................. H04L 27/28
(52) U.S. Cl. .................................. 375/260
(58) Field of Search .................................. 375/260, 377, 375/219, 225, 224, 227, 254, 222; 370/468

(56) References Cited

U.S. PATENT DOCUMENTS

| | | | |
|---|---|---|---|
| 5,479,447 | * 12/1995 | Chow et al. | 375/260 |
| 5,903,608 | * 5/1999 | Chun | 375/260 |
| 5,909,463 | * 6/1999 | Johnson et al. | 375/220 |
| 6,028,486 | * 2/2000 | Andre | 330/297 |

OTHER PUBLICATIONS

John A. C. Bingham, Multicarrier Modulation for Data Transmission: An Idea Whose Time Has Come, *IEEE Communications Magazine*, (1990), pp. 5–12.

John A. C. Bingham, Standards Project for Interfaces Relating to Carrier to Customer Connection of Asymetrical Digital Subscriber Line (ADSL) Equip., T1.413, Issue 2, *Amati Communications* (1997), pp. 98–135.

Peter S. Chow, Bandwidth Optimized Digital Transmission Techniques For Spectrally Shaped Channels With Impulse Noise, (1993), pp. 63–77.

* cited by examiner

Primary Examiner—Chi Pham
Assistant Examiner—Khai Tran
(74) Attorney, Agent, or Firm—The Law Offices of Eugene M. Lee, PLLC

(57) ABSTRACT

A method for fast initialization in discrete multi-tone (DMT) system for digital subscriber line and a method for point-to-multipoint transfer of multicarrier system for continuous transfer of multicarrier signal in digital subscriber line. The method for fast initialization includes performing activation and acknowledgement, transceiver training and performing selectively bit swapping algoritlun using a switch according to the system status for optimizing the channel efficiency in the discrete multi-tone (DMT) system having a transmitting part and receiving part. The method for point-to-multipoint transfer of multicarrier system for continuous transfer of multicarrier signal in digital subscriber line includes the service provider's checking bit swapping information received from a lot of set top units (STUs), calculating the difference of channel error quantity between two sub-channels ($\epsilon_{j,max} - \epsilon_{j,min}$) and performing bit swapping by giving the bit swap priority to the set top units (STU) that has the largest difference value of the channel error.

11 Claims, 8 Drawing Sheets

*Fig.1 (THE CONVENTIONAL ART)*

Fig.8 (THE CONVENTIONAL ART)

METHOD FOR FAST INITIALIZATION OF MULTICARRIER SYSTEM AND POINT-TO-MULTIPOINT TRANSFER OF MULTICARRIER SIGNAL IN DIGITAL SUBSCRIBER LINE

FIELD OF THE INVENTION

The present invention relates to a system continuously transmitting a fast data signal having multicarrier in a digital subscriber line. More particularly, it relates to a method and system for reducing initial delay time occurring on an initialization process by using bit swapping in a multicarrier system, simultaneously capable of transmitting point-to-point and point-to-multipoint.

DESCRIPTION OF THE RELATED ART

A T1.413 of ANSI (American National Standards Institute) adopted a DMT (Discrete Multi-Tone) system as standardization for the ADSL (Asymmetric Digital Subscriber Lines) system. FIG. 1 to FIG. 5 illustrate a basic concept, characteristic, and basic architecture of the DMT system.

Figure 1:
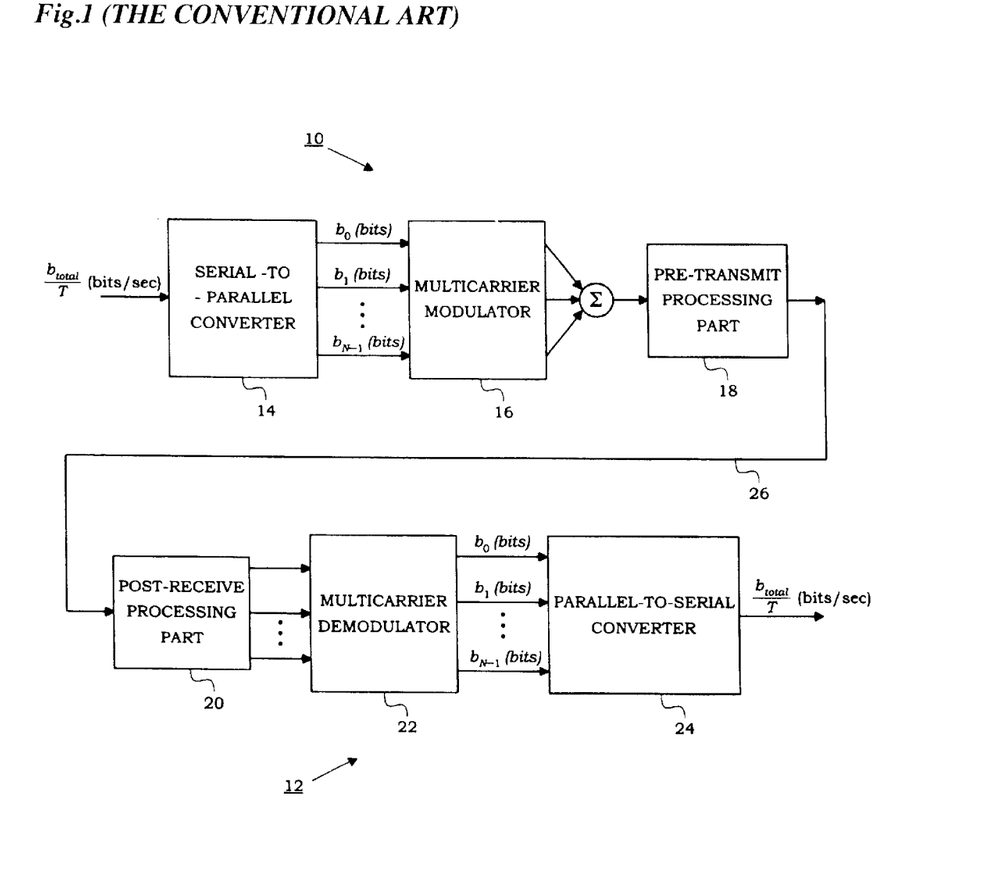
FIG. 1 illustrates a block diagram of transmitter/receiver of the multicarrier system in the conventional art.

FIG. 1 illustrates a basic architecture of a transmitter/receiver of the DMT system. The transmitter 10 is composed of a serial-to-parallel converter 14, a multicarrier modulator 16 and a pre-transmit processing part 18. The receiver 12 is composed of a post-receive processing part 20, a multicarrier demodulator 22 and a parallel-to-serial converter 24. DSL or other types of communication channels can be connected between the transmitter and the receiver.

The serial input data transmitted at the rate of $b_{total}/T$ (bits/sec) form a multicarrier symbol according to accumulating $b_{total}$ bits each by the serial-to-parallel converter 14, and then the symbol period is T. Bits in each multicarrier symbol are modulated by the modulator 16, and the modulator 16 modulates $b_{total}$ bits of the total N subchannels according to the modulating $b_i$ bit of each ith subchannel.

The modulator 16 makes each multicarrier symbol having $b_{total}$ bits into $N_s$ time domain signals by using IFFT (Inverse Fast Fourier Transform). In this case, $N_s$ is equal to 2N.

Also, the receiver 12 can embody the multicarrier demodulator 22 demodulating the $b_i$ bit of an ith subchannel by using FFT (Fast Fourier Transformation). The modulation method embodied above is referred to as DMT modulation and FIG. 2 illustrates a use of frequency for each subchannel of the DMT system.

Figure 2:
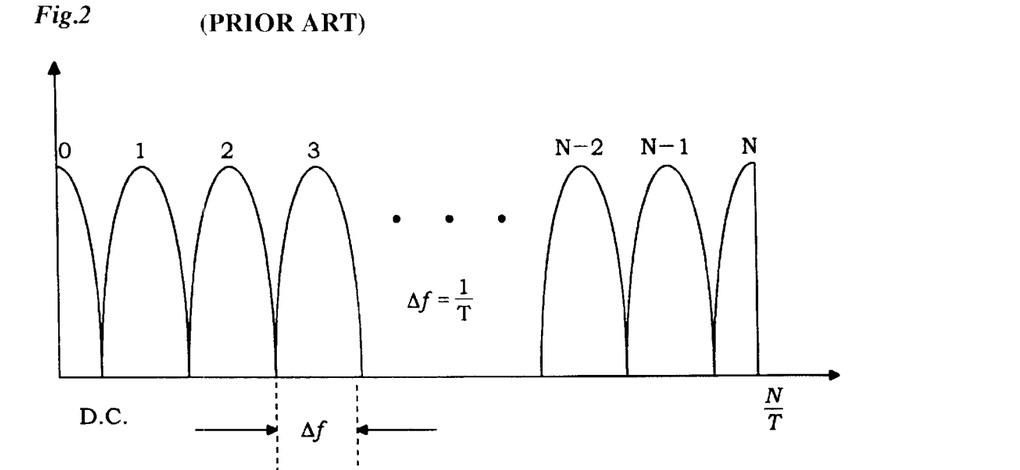
FIG. 2 is a view illustrating frequency content of the multicarrier system.

As illustrated to FIG. 2, each subchannel of the DMT system uses a frequency band of 1/T (Hz), with the entire frequency band of N/T (Hz) being used by the DMT system.

Figure 3:
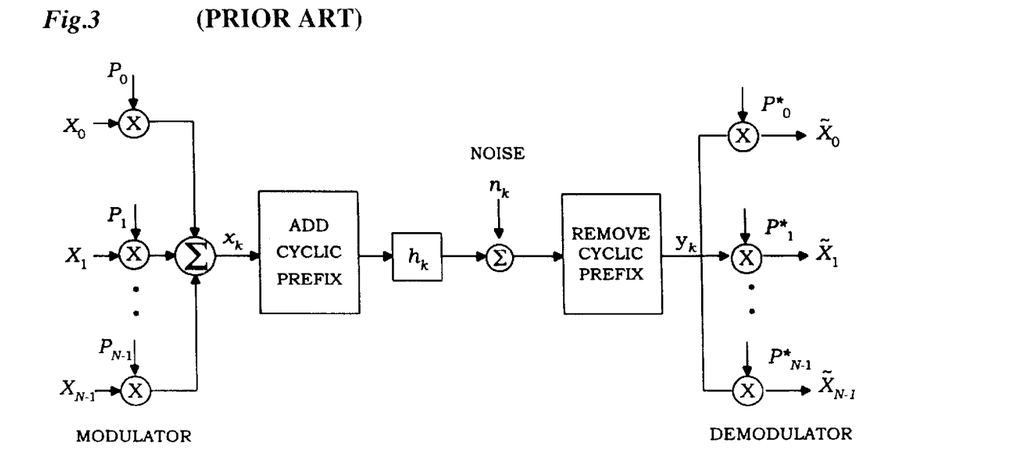
FIG. 3 is a block diagram illustrating the general definition of the multicarrier system.

FIG. 3 illustrates a normal architecture for the operation of the modulator/demodulator of the DMT system. $\{X_0, X_1, \ldots, X_{N-1}\}$ signifies an original complex input data symbol, $\{X_k\}$ signifies a modulated data sequence (before adding a cyclic prefix), $\{h_k\}$ signifies a discrete time channel response, $\{n_k\}$ represents an additional noise sequence, $\{y_k\}$ signifies a received sequence (after removing the cyclic prefix), $\{\tilde{X}_0, \tilde{X}_1, \ldots, \tilde{X}_{N-1}\}$ represents a decoded complex data symbol. $P_i$ and $P_i^*$ represent a modulating vector and a demodulating vector respectively, and preferably are orthogonal functions. That is, $P_i \cdot P_i^* = \delta_{ij}$ where, $\cdot$ is the dot product of two vectors, $$\delta_{ij} = 1 \quad (i = j)$$
$$= 0 \quad (i \neq j).$$

Each vector can be expressed by using IDFT (Inverse Discrete Fourier Transform) and DFT (Discrete Fourier Transform):

$$X_m = \frac{1}{\sqrt{2N}} \sum_{n=0}^{2N-1} x_n e^{\frac{-j2\pi mn}{2N}},$$

$$x_m = \frac{1}{\sqrt{2N}} \sum_{n=0}^{2N-1} X_n e^{\frac{j2\pi mn}{2N}}$$

The DMT system having N subchannels in the frequency domain uses the 2N-sized DFT, and samples in a time domain are real numbers due to conjugate symmetry in the frequency domain. IDFT and DFT use the IFFT and the FFT algorithm respectively. Cyclic prefix is a technology for preventing data from causing interblock interference, in which a start point of a block is affected by the end point of a block in the DMT system, and transmits data in front of the corresponding block according to copying the last v samples in the time domain after IDFT. The value v is determined by the impulse response length of a channel.

Figure 4:
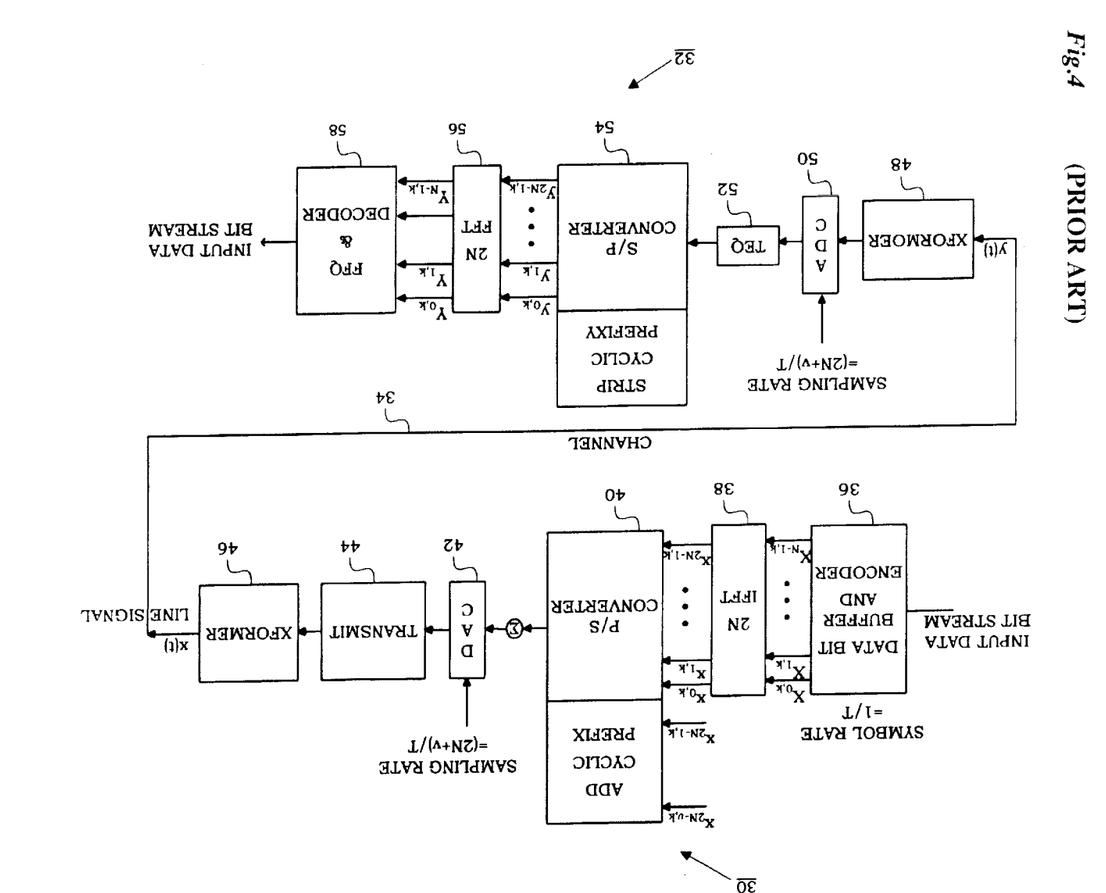
FIG. 4 illustrates a detailed view of the multicarrier system.
Figure 5:
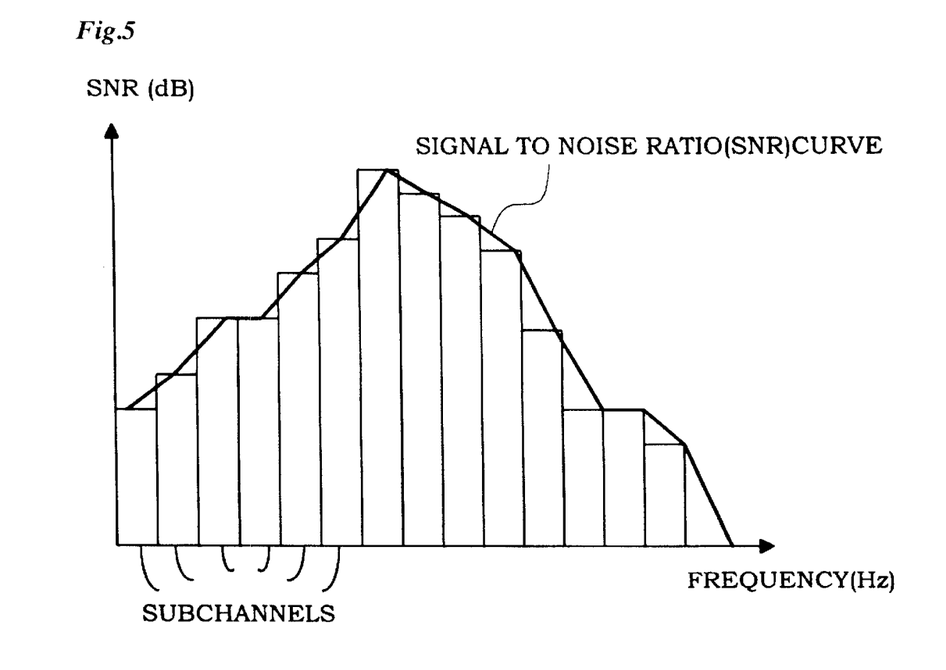
FIG. 5 is a view illustrating flexible bandwidth usage of the multicarrier system.

FIG. 4 is a block diagram illustrating the detailed operation for the transmitter 30 and the receiver 32 of the DMT system. The serial input data are converted into parallel data by accumulating a block of data, and encoded by the encoder 36. The parallel output data from the encoder 36 are modulated by IFFT 38, and converted again into serial data by the parallel-to-serial converter 40. These modulated signals are converted into the analog signals by the digital-to-analog converter 42 after adding a cyclic prefix, and are transmitted to the communication channel 34 via the low-pass filter 44 and the DC isolating transformer 46. The analog signals received in the receiver 32 are converted into the digital signals via the analog-to-digital converter 50 after passing through the DC isolating transformer and the low-pass filter 48. These signals are demodulated by the FFT 56 after passing through a TEQ (Time domain Equalizer) 52 having a FIR (Finite Impulse Response) filter to minimize the real memory length of this channel, and then removing the cyclic prefix and converting into parallel signals by the serial-to-parallel converter 54.

However, because the component of amplitude for the each frequency is different from the delay characteristics in the frequency band used, there occurs a difference between the transmitted signal and the received signal. That is, there is a difference between the parallel input of the decoder and the parallel output of the encoder. To solve this problem, the DMT system uses a simple type of a FEQ (Frequency domain Equalizer) 58, that uses N one-tap complex equalizers to adjust attenuation and delay of each subchannel. The signals passing through the FEQ are converted into serial signals via the decoder 58. Generally, the output data stream of the serial decoder 58 are identical with the input data stream of the serial encoder 36 in an ideal system.

In the DSL (Digital Subscriber Lines) using a telephone line having a large amount of channel attenuation and frequent ISI (Inter Symbol Interference) in the communication channel, an equalizer has to be used to minimize the ISI. Also, it is needed to optimize transmission bandwidth by using line-by-line for the best performance because of very different transmission environments of the subscribers.

In the conventional single carrier QAM (Quadrature Amplitude Modulation) system, symbol rate and carrier frequency determine transmission bandwidth. But, the single carrier system cannot sensitively regulate the variation of the symbol rate. That is, the symbol rate for the fixed data rate cannot help being regulated by the rate of $b_{symbol}/(b_{symbol}+1)$. Herein, $b_{symbol}$ means the number of bits transmitted per data symbol. For example, in a case of the single carrier QAM having the symbol rate of 10 MHz, the transmission bandwidth of 40 Mbps (4 bit/symbol), 50 Mbps (5 bit/symbol) is determined by the number of bit transmitted per symbol. That is, the transmission bandwidth can only be adjusted in units of 10 MHz. In the DMT system having the symbol rate of 10 MHz and having 256 subchannels, each subchannel is assigned an adequate number of bits according to SNR (signal-to-noise ratio) of each channel. The DMT system can regulate a more sensitive transmission band than the single carrier system because what increases/decreases one bit for one subchannel among them, sensitively affects (10 MHz/256 bps) the whole transmission bandwidth. This is called "bit loading", and this is performed in the initialization of the DMT system. That is, since the subchannel having good SNR characteristics assigns a large number of bits and the subchannel of bad SNR assigns few bits, the DMT system can gain the best performance.

Figure 7:
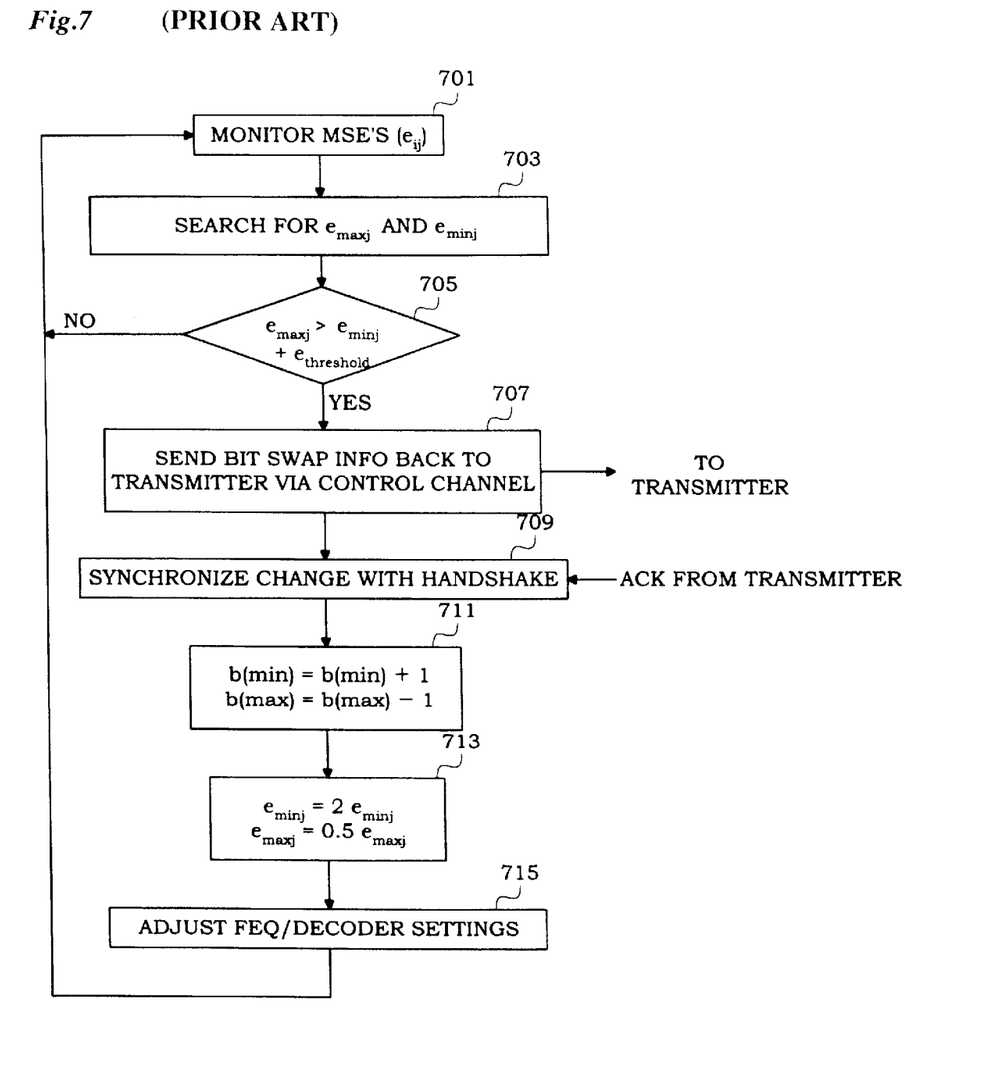
FIG. 7 is a flow chart illustrating the bit swapping procedure.

Also, the multicarrier system can reduce error probability that can happen during transmission by moving one or two bits from a subchannel to the other subchannel according to the change of channel conditions that can occur during data transmission. This is referred to as a bit swapping, as is illustrated in FIG. 7. An important feature of bit swapping is to operate on a receiver as well as a transmitter. By this feature, it is possible to change the number of the bits or transmission energy assigned in each subchannel without stopping data transmission. First, bit swapping checks steady-state MSE (Mean-Squared Error) of each subchannel in the operating receive processing of the multicarrier system, and if MSE of a subchannel is more than the critical value (a point 3 dB away from the other subchannel), it then swaps one bit of the subchannel which MSE is big as a subchannel to one in which MSE is small. Then, the receiver can transmit bit swap information by using a control channel according to simple hand-shaking steps.

The bit swapping algorithm will be explained in detail as follows.

1. Monitor steady-state MSE of all used channels $$|E_{i,j}|^2 = R\{E_{i,j}^2\} + 1\{E_{i,j}^2\},$$

$$\epsilon_{i,j}^2 = (\lambda) \cdot \epsilon_{i,j-1} + (1-\lambda) \cdot |E_{i,j}|^2$$

where,
$E_{i,j}$ is a difference between the input and the output of the hard decision slicer at time j of each subchannel i.
$\epsilon_{i,j}$ is computed by averaging successive squared error magnitudes.
$\lambda$ is a positive fraction slightly less than 1.

2. Calculate the maximum value ($\epsilon_{j,max}$), the minimum value ($\epsilon_{j,min}$) of the averaging successive squared error for all channels used.

3. If $(\epsilon_{j,max}) > (\epsilon_{j,min}) + (\epsilon_{threshold})$ (3 dB), go to step 4, otherwise go to step 1.

4. Transmit bit swapping information to the transmit processing, and synchronize the change by simple hand-shaking.

5. Let b(min)=b(min)+1, b(max)=b(max)−1.

6. Let $\epsilon_{j,min} = 2 \cdot \epsilon_{j,min}$ and, $\epsilon_{j,max} = 0.5 \cdot \epsilon_{j,max}$.

7. Change slicer setting of two subchannels.

T1.413 of ANSI used in ADSL defines the hand-shaking protocol for bit swapping information between a transmitter/receiver block. In the protocol, the maximum two pair of bit swapping information is transmitted every time, to transmit a superframe (1 superframe=69 DMT symbol, 1 DMT symbol=544 data samples).

The DMT system requires some kind of additional operation different from the conventional single carrier system. The present invention, in the DMT system, is intended to minimize initialization delay by using bit swapping. The initialization establishes a communication link between a transmitter/receiver of the DMT system connected physically. The initialization achieves a level adjust of AGC (Automatic Gain Controller), synchronization and equalizer training by giving and taking promised signals between the transmitter/receiver to optimize throughput and reliability. Also the initialization determines the whole transmission velocity, the number of bit that will transmit per each subchannel, and power, by detecting a feature of each subchannel (SNR).

So that the DMT system operates normally, the initialization is essential, T1.413 of ANSI defines the initialization for the DMT system as taking four steps as follows.

1. Activation & Acknowledgment

Check establishment of the link between ATU-C (ADSL Terminal Unit-Central office) and ATU-R (ADSL Terminal Unit-Remote).

2. Transceiver Training

Perform AGC adjustment, power level decision of upstream and downstream, timing recovery and equalizer training.

3. Channel Analysis

Carry out transmission of four options for data rate and data format, transmit power level decision, and measurement of SNR of each subchannel.

4. Exchange

Obtain the performance margin for the maximum number of bits capable of transmitting per symbol, average loop attenuation and each option, select an option (data rate) having an adequate margin among them, and go into operational state after getting the number of bits of subchannel and gain.

Users can be served after performing the initialization. The conventional DMT system has two faults as follow.

The first one, as noted above, is that the DMT system has to achieve the initialization before the real data service.

If step 3 and step 4 are added among the four steps, there become at least 20,000 DMT symbols (1 DMT symbol is 544 data sample, and takes 250 μsec in the ADSL). In conclusion, the users have to wait more than a 20,000 DMT symbol period (about 5-sec), though the step 1 and step 2 are excepted (one cannot know the exact wait time because of operating by waiting inter-response between the transmitter/receiver). That added wait time is undesirable.

The other problem is that it is impossible to transmit point-to-multipoint in ADSL.

Figure 6:
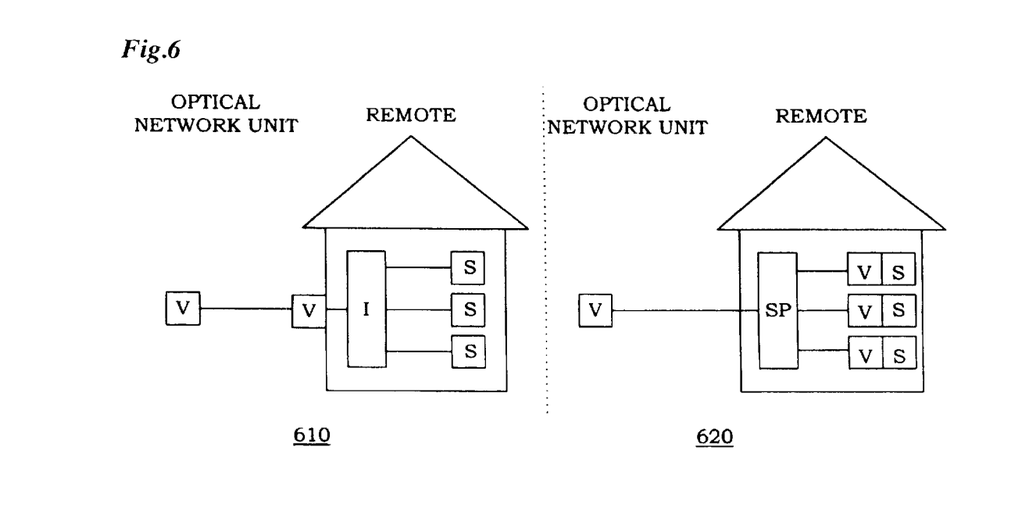
FIG. 6 is a view illustrating a structure of the point-to-point transmission and point-to-multipoint transmission.

In the case of VDSL (Very-high-speed Digital Subscriber Lines) during standardization in T1E1.4 of ANSI, this standard provides user data of maximum 52 Mbps. In this case, the users can be served many kinds of multi-media through several STUs (Set Top Units), in home or office, simultaneously, and the network architecture of the users may be considered point to point and point-to-multipoint transmission. In FIG. 6, the point-to-point transmission 610 is that the data received through a system, in which a VDSL modem exists in a home or office, are transmitted to each STU via LAN or other in-house network. The point-to-multipoint transmission 620 is a method for transmitting data from a communication channel to each STU through a splitter in a home or office.

Figure 8:
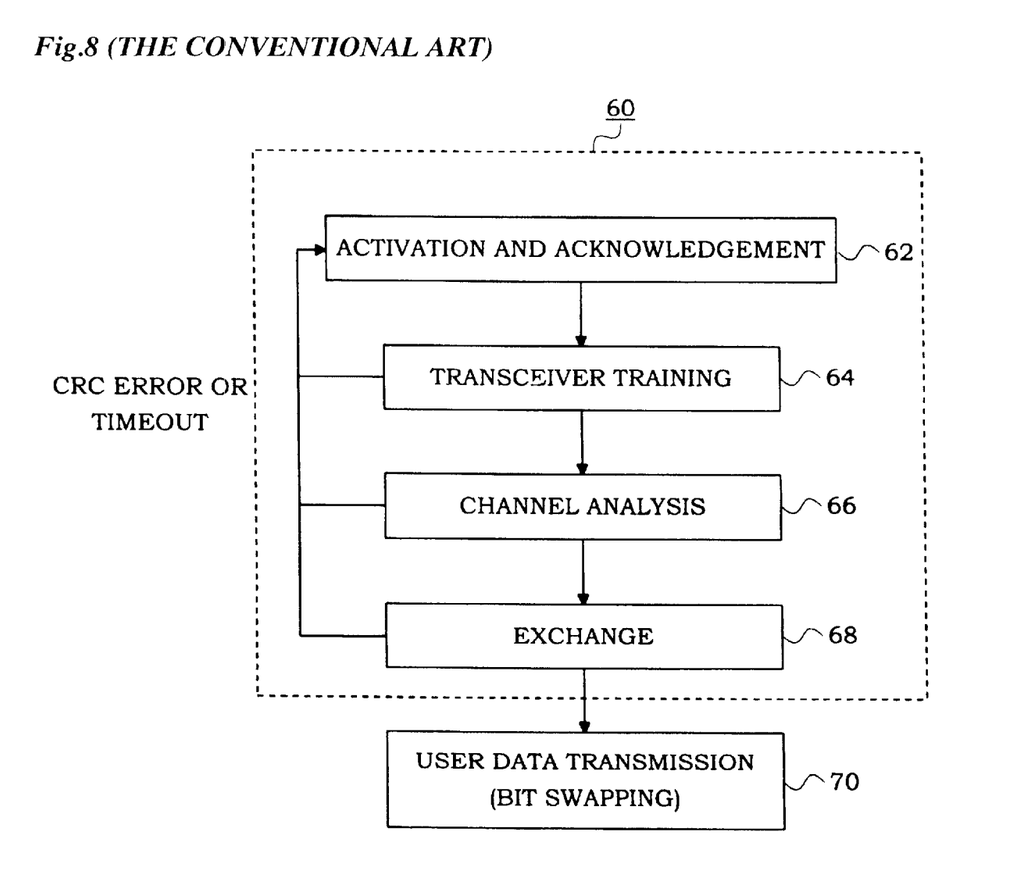
FIG. 8 is a flow chart illustrating a procedure of initialization and data transmission in the conventional DMT system.

FIG. 8 illustrates a flow chart of initialization by the conventional ADSL. If a user wants to be served, the system goes directly to initialization 60, optimizes the DMT system and begins data transmission 70 via activation and acknowledgment 62, transceiver training 64, channel analysis 66 and exchange 68. In the initialization, each block gives and takes various kinds of signal. If an error is detected by CRC (Cyclic Redundancy Check) code between data transmitted or if a timeout occurs, the initialization begins again with activation and acknowledgment 62. If the initialization is finished successfully, data transmission is started to serve the users, and then optimization of the transmitter/receiver by bit swapping is continued to obtain the maximum transmission efficiency in consideration of the channel feature that changes slowly.

If a STU-2 attempts another operation during operation of a STU-1, initialization must be performed, and thus it is impossible to transfer point-to-multipoint in the DMT system. Also there is a problem that an ONU (Optical Network Unit) providing service cannot transmit the training sequence for initialization because the STU-1 which is already operating is provided data service.

SUMMARY OF THE INVENTION

The present invention is intended to provide a method for point-to-multipoint transfer in the subscriber lines by using a way such that in the initialization process that is indispensable in the DMT system, after storing the initialization data to memory in the initialization process at a first system, performs fast initialization by downloading the initialization data in the memory in next initialization process, and by using them makes possible to do a point-to-multipoint transfer.

To achieve the above object, one embodiment of the method for fast initialization in the DMT system for digital subscriber lines in the present invention includes a method for fast initialization in the DMT system for digital subscriber line comprising the steps of:

(a) performing activation and acknowledgement;
(b) transceiver training; and
(c) performing selectively bit swapping algorithm using switching according to the system status for optimizing the channel efficiency, in a DMT system having a transmitting sub-system comprising a serial to parallel converter changing the serial input data transmitted through the communication channel into the parallel data, a multicarrier modulator part encoding the parallel data by sub-channel and then multicarrier modulating, and a pre-transmit processing part for transmitting the modulated signal over channel; and a receiving sub-system comprising a post-receive processing part changing the signal that inputted through the channel into the signal for modulating, a multicarrier demodulator part for demodulating the signal that has been passed through the post-receive processing part, and a parallel to serial converter changing the demodulated signal into the original serial data type.

According to one embodiment of the present invention, it is preferable that the installation status of the system is one of cases where a user installs the system at first or an error occurs when writing or reading the initialization data or channel conditions are much changed rather than the initial installations, so the transmission efficiency is decreased such that bit swapping can not solve it or the user receives services from the system that has already been installed.

According to one embodiment of the present invention, it is preferable that the step of performing bit swapping algorithm in one of cases where the user installs the system at first or an error occurs when writing or reading the initialization data or channel conditions are much changed rather than the initial installations, so the transmission efficiency is decreased such that bit swapping can not solve it further comprises the steps of:

(a) performing channel analysis and exchange by a switch;
(b) optimizing the DMT system;
(c) transmitting data; and
(d) storing the data to a memory on the user terminal.

According to one embodiment of the present invention, it is preferable that it performs bit swapping algorithm transmitting data practically in the step of transmitting data.

According to one embodiment of the present invention, it is preferable that the data is a bit and it is a value of a power allocation table.

According to one embodiment of the present invention, it is preferable that the change of the value of the bit and the value of the power allocation table due to the change of noise conditions is processed by bit swapping algorithm.

According to one embodiment of the present invention, it is preferable that the noise is one among AWGN, NEXT, FEXT, or RFI.

According to one embodiment of the present invention, it is preferable that the step of user receives services from the system that has already been installed comprises the steps of:

(a) downloading the initialization data that is stored in memory by the user terminal in one of steps such that user installs the system at first or an error occurs when writing or reading the initialization data or channel conditions are much changed rather than the initial installations, so the transmission efficiency is decreased such that bit swapping can not solve it;
(b) sharing data by user's transmitting the initialization data to service provider;
(c) performing bit swapping algorithm;
(d) optimizing transmitter/receiver, considering the present channel status; and
(e) starting data services maintaining the bit swapping algorithm.

According to one embodiment of the present invention, it is preferable that in the step of performing channel analysis and exchange by the switch, if an error is detected by CRC (Cyclic Redundancy Code) check or timeout occurs such that the meaningful response is not received from the relative transmitting terminal within the pre-determined time period, it restarts from the step of performing activation and acknowledgement.

According to one embodiment of the present invention, it is preferable that the more the number of FEXT, the more bit swapping from low frequency sub-channel to high frequency sub-channel is needed.

To achieve the above object, one embodiment of the method for point-to-multipoint transfer of multicarrier system for continuous transfer of multicarrier signal in digital subscriber line includes the steps of:

(a) service provider's checking bit swapping information received from a lot of STUs;

(b) calculating the difference of channel error quantity between two sub-channels ($e_{j,max} - e_{j,min}$); and (c) performing bit swapping by giving the bit swap priority to the STU that has the largest difference value of the channel error.

BRIEF DESCRIPTION OF THE DRAWINGS

Other objects and advantages of the invention will become apparent upon reading the following detailed descriptions and upon reference to the drawings.

While modifications and alternative forms of the present invention can be envisioned, specific embodiments thereof have been shown by way of example in the drawings and will herein be described in detail. It should be understood, however, that it is not intended to limit the invention to the particular forms disclosed, but on the contrary, the intention is to cover all modifications, equivalents, and alternatives falling within the spirit and scope of the invention as defined by the appended claims.

DESCRIPTION OF THE PREFERRED EMBODIMENTS

The descriptions of important symbols used in the above drawings are as follows:

| | |
|---|---|
| 10: transmitter | 12: receiver |
| 14: serial-to-parallel converter | 16: multicarrier modulator |
| 18: pre-transrnit processing part | 20: post-receive processing part |
| 22: multicarrier demodulator | 24: parallel-to-serial converter |
| 26: communication channel | 30: transmitter |
| 32: receiver | 34: communication channel |
| 36: data bit buffer and encoder | 38: Inverse Fast Fourier Transformer (IFFT) |
| 40: parallel to serial converter | 42: digital to analog converter (DAC) |
| 44: low-pass filter | 46: D.C isolating transformer |
| 48: D.C isolating transformer & low pass filter | 50: analog to digital converter (ADC) |
| 52: time domain equalizer (TEQ) | 54: serial to parallel converter |
| 56: Fast Fourier Transformer (FFT) | 58: Frequency Domain Equalizer (FEQ) & Decoder |
| 60: the conventional initialization | 62: Activation and Acknowledgement |
| 64: transceiver training | 66: channel analysis |
| 68: channel exchange | 70: user data transmission (bit swapping) |
| 80: a initialization procedure in the present invention | 82: Activation and Acknowledgement |
| 84: transceiver training | 86: switch |
| 88: channel analysis | 90: exchange |
| 92: storing the initialization data (by user) | 94: downloading the initialization data (by user)/ transmitting the initialization data (from user to service provider)/bit swapping |
| 96: user data transmission (bit swapping) | |
| V: VDSL modem (Very-High-Speed Digital Subscriber Lines) | |
| SP: splitter | S: Set top Unit |
| I: In-house network unit | |

Figure 9:
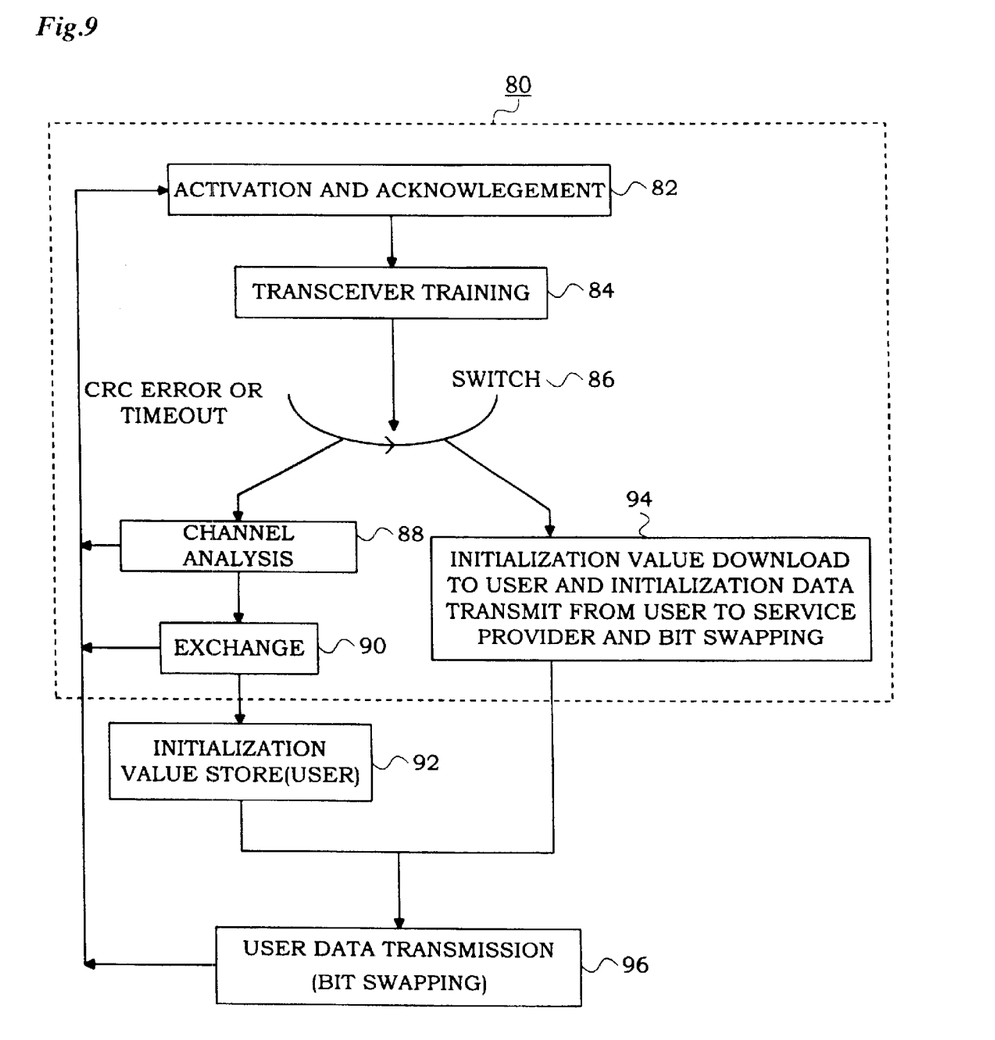
FIG. 9 is a flow chart illustrating a fast initialization procedure in the present invention.

FIG. 9 is a flow chart illustrating a fast initialization procedure in the present invention. When a user, who purchases the system or changes the location of the system, first installs the system, the user performs initialization in the conventional way and then stores the data (bit and power allocation table) in a memory to reuse by downloading later. At this time, the change of values of the bit and power allocation table based on the variation of noise conditions (AWGN, NEXT, FEXT, RFI) is processed by a bit swapping algorithm.

From the point of view of the ADSL/VDSL network architecture using a real telephone line, information about users is different and they are fixed, so information about each user that is determined at first changes somewhat, because the distance between a sender terminal and receiver terminal and a kind of line are the most important factors that determine a channel characteristic. The channel characteristic for users can be varied by use over a period of time according to the noise conditions of the line. But it is a relatively very small variation, so it can be sufficiently compensated by performing the bit swapping algorithm.

Using this method, the process for channel analysis and exchange that takes much time in the initialization, is substituted by the process for downloading the initialization data, transmitting the initialization data and bit swapping. Therefore, the initialization of the DMT system can be achieved at the faster speed rather than the conventional way.

The initialization method in the present invention also performs a step of Activation and Acknowledgement 82 and a step of transceiver training 84, like the conventional method. The switch 86 can select either from the conventional method or the present method according to the cases such that the system is installed at first or it is reused after installation of the system, as stated above. The switch 86 can be comprised as a hand switch that the user operates directly, as one example.

Although the system is initialized at first, sometimes it does not act normally because of a lot of factors, such that an error occurs when writing or reading the initialization data in memory or channel conditions are greatly changed with respect to the initial installations. In these situations, the transmission efficiency is decreased such that bit swapping cannot solve it. At this time, initialization can be performed by operating the switch 86 as in the prior method like the first installation. Also in the later use, the algorithm in the present invention can be performed by downloading the initialization data from the memory.

When the switch 86 selects the prior initialization procedure, the user system side performs a step of channel analysis 88 and exchange 90, and then performs a step of storing the initialization data in the memory 92. In addition, when the switch 86 selects an algorithm by the present invention, downloading is performed for the initialization information has been stored in the user side system and the initialization information is transferred again to the service provider side so that the initialization information is shared. Then a step of optimizing the transmitter/receiver is performed by using the bit swapping algorithm, considering the present channel status with maintaining the bit swapping algorithm, and data services can start.

Using the initialization procedure in the present invention, it is possible to transfer information to the subscriber side that needs point-to-multipoint transmission. The most important factor in the point-to-multipoint transmission is that it should be able to receive data in the receiving terminal without an extra training sequence. But, it is necessary for the DMT system to perform the step of initialization that includes each of training sequences to optimize the transmission efficiency between the transmitting terminal and receiving terminal. On the other hand, a method for initialization in the present invention can leave out the step of initialization between the transmitting terminal and receiving terminal, so the point-to-multipoint transmission is possible.

On the point-to-multipoint transmission equally, a user side modem can use the bit swapping algorithm in the same ways. But, the service provider side can receive requests for the bit swapping algorithm from many STUs (Set Top Units) at the same time, and each request for the bit swapping algorithm can be different. So from the requests, the request that has the largest difference of error quantity between two subchannels ($\epsilon_{j,max}-\epsilon_{j,min}$) is given the highest priority to be accepted first of all. As stated above, bit swap information should contain the value of difference of error quantity as well as the number of information bits to be swapped and the number of subchannels. By using the method as stated above, fast initialization is possible and the service provider side does not need to transmit a training sequence for initialization though there are requests by other STUs in the middle of a transmission, so point-to-multipoint in the DMT system is possible.

The followings are embodiments of using the prior initialization method and using the initialization method in the present invention under the conditions of Additive White Gaussian Noise (AWGN) and Far-End Crosstalk (FEXT) (from zero to twelve).

Figure 10:
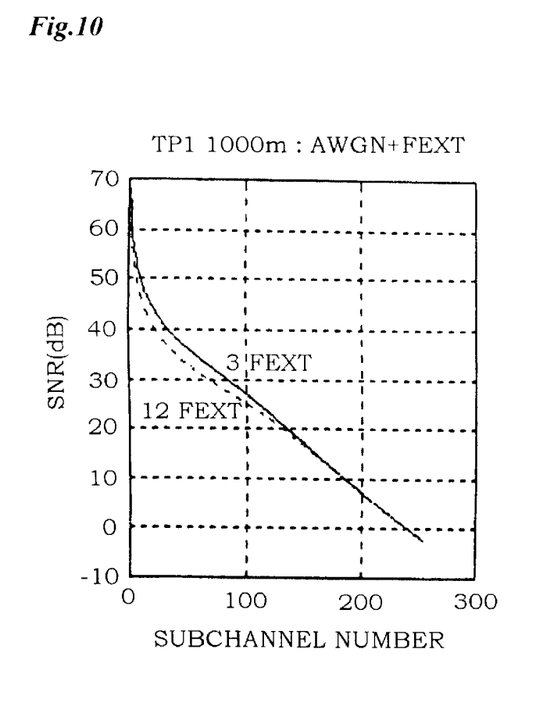
FIG. 10 is a view illustrating an embodiment of the present invention such that it shows signal-to-noise ratio when the number of FEXT is three and twelve.
Figure 11:
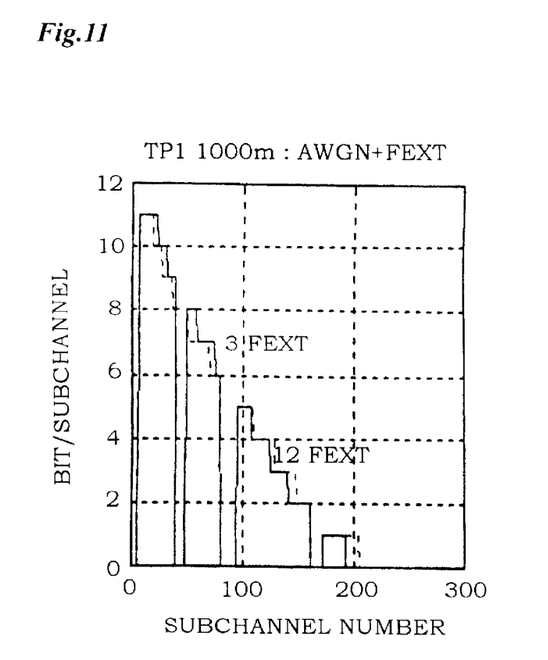
FIG. 11 is a view illustrating bit loading for the embodiment of FIG. 10.

FIG. 10 and FIG. 11 illustrate the Signal to Noise Ratio (SNR) and the result of bit loading of each subchannel when the number of VDSL noise are three and the number of FEXT noise are twelve in transmission of 26 Mbps downstream and 3.2 Mbps upstream on the TP1 (Twisted Pair type1) cable using asymmetric transmission by SDMT (synchronized DMT).

As illustrated in FIG. 10, the more the FEXT noise, the worse the Signal to Noise Ratio in the low frequency space. So, bit swapping from the subchannel of low frequency space to the subchannel of high frequency space is needed.

The following Table 1 and Table 2 show the extent of a variation of bit loading table on the TP1 and TP2 cables.

TABLE 1

Quantity of variation of bit loading table according to the variation of the number of FEXT. (TP1)

| Variation of number of FEXT | Number of bits to be swapped | Variation of number of FEXT | Number of bits to be swapped |
|---|---|---|---|
| 0 1 | 43 | 6 7 | 5 |
| 1 2 | 10 | 7 8 | 2 |
| 2 3 | 6 | 8 9 | 2 |
| 3 4 | 6 | 9 10 | 2 |
| 4 5 | 4 | 10 11 | 2 |
| 5 6 | 1 | 11 12 | 1 |

TABLE 2

Quantity of variation of bit loading table according to the variation of the number of FEXT. (TP2)

| Variation of number of FEXT | Number of bits to be swapped | Variation of number of FEXT | Number of bits to be swapped |
|---|---|---|---|
| 0 1 | 105 | 6 7 | 1 |
| 1 2 | 16 | 7 8 | 2 |
| 2 3 | 9 | 8 9 | 1 |
| 3 4 | 3 | 9 10 | 1 |
| 4 5 | 2 | 10 11 | 0 |
| 5 6 | 2 | 11 12 | 2 |

Table 1 and Table 2 indicate that the number of bits to be swapped is large here it varies from not being FEXT to being FEXT, but the number of bits to be swapped is not large according to the increase and/or decrease of the number of FEXT in other cases. That is, suppose that the number of FEXT are three when the user has installed system first and stored initialization data into the memory, and then the number of FEXT is varied to twelve when the user next needs services, twenty five pairs of bit swapping (6+4+1+5+2+2+2+1) are performed as illustrated in the Table 1 using TP1 1000 meters cable. As stated above, in the case of ADSL standard, two pairs of bits are swapped per superframe (1 superframe equals 69 DMT symbols) by the bit swapping protocol, so the step of channel analysis and exchange is substituted within 13 superframes in total (69 times 13 makes 897 symbols). As a result, it is possible to perform the fast initialization compared with the conventional step of channel analysis and exchange such that it needs 20,000 DMT. Besides, if it is provided such that four pairs of bit swapping per superframe is possible by modifying the bit swapping protocol a little, the time is reduced by half and fast initialization is possible.

The present invention has an advantage in that it can achieve initialization faster than the prior method by performing the simple step of initialization and only by adding a small amount of memory. In addition, it has an advantage in that it is also possible to perform fast initialization and perform point-to-multipoint transfer in case of VDSL application with a standardization task in progress when a method for fast initialization in the present invention is used.

What is claimed is:

1. A method for fast initialization in a discrete multi-tone (DMT) system for a digital subscriber line, the discrete multi-tone system having a transmitting part comprising a serial to parallel converter converting a serial input data that will be transmitted through the communication channel into a parallel data, a multicarrier modulator part encoding said parallel data by each sub-channel, and a multicarrier-modulating and a pre-transmit processing part for transmitting said modulated signal over the communication channel efficiently; and a receiving part comprising a post-receive processing part changing said signal inputted through a communication channel into the signal for modulating, a multicarrier demodulator part for demodulating the signal that has been passed through said post-receive processing part and a parallel to serial converter converting said demodulated signal into the original type of serial data, the method comprising the steps of:

(a) performing activation and acknowledgement on a communication channel between a transmitting part and a receiving part;

(b) transceiver training on a communication channel between the transmitting part and the receiving part; and (c) performing selective bit swapping algorithm on data from the communication channel, using a switch according to an installation status of said system to optimize the channel efficiency.

2. A method for fast initialization in a discrete multi-tone (DMT) system for a digital subscriber line as set forth in claim 1, wherein the installation status of said system is one of cases (a) where a user installs the system first, (b) where an error occurs when writing or reading the initialization data, (c) where channel conditions deteriorated after the initial installations, so the transmission efficiency is decreased such that bit swapping cannot solve it, and (d) where the user is served from the system that has already been installed.

3. A method for fast initialization in a discrete multi-tone (DMT) system for a digital subscriber line as set forth in claim 2, wherein the step of performing the bit swapping algorithm in one of the cases where the user installs the system at first or where the error occurs when writing or reading the initialization data or where channel conditions deteriorated after the initial installations, so the transmission efficiency is decreased such that bit swapping cannot solve it, the method further comprises the steps of:

(d) performing channel analysis and exchange on the communication channel by said switch;

(e) optimizing the discrete multi-tone (DMT) system;

(f) transmitting data on the communication channel from the transmitting part to the receiving part; and (g) storing said data into a memory on a user terminal at the receiving part.

4. A method for fast initialization in a discrete multi-tone (DMT) system for a digital subscriber line as set forth in claim 3, wherein the step of performing the bit swapping algorithm on said data is performed in said step of transmitting said data.

5. A method for fast initialization in a discrete multi-tone (DMT) system for a digital subscriber line as set forth in claim 3, wherein said data are bits and values of a power allocation table.

6. A method for fast initialization in a discrete multi-tone (DMT) system for a digital subscriber line as set forth in claim 5, wherein the value of said bits and the value of said power allocation table are changed due to the change of noise conditions, and said values are processed by the bit swapping algorithm.

7. A method for fast initialization in a discrete multi-tone (DMT) system for a digital subscriber line as set forth in claim 6, wherein said noise conditions are one of additive white Gaussian noise (AWGN), near-end crosstalk (NEXT), far-end crosstalk (FEXT), or radio frequency interference (RFI).

8. A method for fast initialization in a discrete multi-tone (DMT) system for a digital subscriber line as set forth in claim 1, wherein said switch is a hand-operated switch that a user controls manually.

9. A method for fast initialization in a discrete multi-tone (DMT) system for a digital subscriber line as set forth in claim 2, wherein said step of performing bit swapping algorithm in the case where the user is served from the system that has already been installed, the method further comprises the steps of:

(a) downloading the initialization data stored in memory by the user terminal such that the user installs the system first, such that the error occurs during writing or reading the initialization data, or such that channel conditions deteriorate rather than the initial installations, so the transmission efficiency is decreased such that bit swapping cannot solve it;

(b) sharing data by user's transmission of said initialization data to a service provider;

(c) performing the bit swapping algorithm on the data;

(d) optimizing a transmitter/receiver, considering the present status of the channel; and (e) starting data services on the channel with maintaining said bit swapping algorithm.

10. A method for fast initialization in a discrete multi-tone (DMT) system for a digital subscriber line as set forth in claim 3, wherein, the system restarts from said step of performing activation and acknowledgement when an error in the data is detected by CRC (Cyclic Redundancy Code) check and when a timeout occurs on the channel such that a meaningful response is not received from the relative transmitting terminal within a pre-determined time period in said step of channel analysis and exchange by said switch, if error is detected.

11. A method for fast initialization in a discrete multi-tone (DMT) system for a digital subscriber line in claim 1, wherein bit swapping from low frequency domain sub-channel to high frequency domain sub-channel increases as the number of far-end crosstalk (FEXT) increases.

* * * * *